United States Patent [19]
Anton et al.

[11] Patent Number: 4,748,048
[45] Date of Patent: May 31, 1988

[54] METHOD OF INSULATING ELECTRICAL CONDUCTORS BY IMPREGNATION

[75] Inventors: Alain Anton, Chaponnay; Alain Dubuisson, Meyzieu, both of France

[73] Assignee: Alsthom, S.A., Paris, France

[21] Appl. No.: 922,082

[22] Filed: Oct. 20, 1986

[30] Foreign Application Priority Data

Oct. 22, 1985 [FR] France ............................ 85 15667

[51] Int. Cl.$^4$ .............................................. B05D 5/12
[52] U.S. Cl. .................................. 427/116; 156/172; 427/117; 427/177; 427/178; 427/179
[58] Field of Search ............... 427/116, 117, 177, 179, 427/178; 156/172

[56] References Cited

U.S. PATENT DOCUMENTS

| | | | |
|---|---|---|---|
| 2,847,395 | 8/1958 | Wear | 428/415 |
| 4,046,938 | 9/1977 | Torossian et al. | 428/415 X |
| 4,543,272 | 9/1985 | Anton | 427/58 |
| 4,582,723 | 4/1986 | Markert et al. | 427/116 |
| 4,606,785 | 8/1986 | Zeise | 428/415 X |

OTHER PUBLICATIONS

8109 IEEE Trans. on Electrical Insulation, vol. EI-13, No. 6 (1978-12).

*Primary Examiner*—Thurman K. Page
*Attorney, Agent, or Firm*—Kenyon & Kenyon

[57] ABSTRACT

A method of insulating electrical conductors wherein a tape of porous mica paper and of glass felt or cloth or plastic material film is wound round the conductors, wherein the tape is impregnated with a varnish comprising a polymerizable liquid resin, and wherein the impregnated tape is polymerized by heat treatment, the method including the improvement whereby an adhesive powder is initially added to the tape to provide adhesion between the porous mica paper and the glass felt or cloth or the plastic material film, said adhesive powder comprising a polymer having chains of oxazolidone groups containing groups with epoxy terminations, and whereby the polymerizable liquid resin of the varnish essentially contains isocyanate groups which are transformed into isocyanurate groups during polymerization.

9 Claims, No Drawings

METHOD OF INSULATING ELECTRICAL CONDUCTORS BY IMPREGNATION

The present invention relates to a method of insulating electrical conductors by impregnation using isocyanurate and oxazolidone cycle resins, in which a tape of porous mica paper and a glass felt or cloth or a film of plastic material is wound round the conductors, in which the tape is impregnated with a varnish including a polymerizable liquid resin, and in which the impregnated tape is then subjected to polymerization by heat treatment.

BACKGROUND OF THE INVENTION

ALSTHOM's published French Patent application No. 2550373 (equivalent to U.S. Pat. No. 4,543,272) describes an insulating method of this type, in which a tape is impregnated with a liquid epoxy resin and a benzyltrialkylammonium halide having an alkyl chain containing not more than 3 carbon atoms, in which the impregnated tape is dried at a temperature of not more than 135° C., and is then impregnated with a varnish based on an isocyanate derivative prior to polymerizing the tape by heat treatment. Although the insulation obtained in this way is highly satisfactory and presents excellent electrical properties, research is nevertheless continuing in further improving the adhesion between the tape's porous mica paper and its glass felt or cloth or its film of plastic material, and also in increasing the flexibility of the resulting tape, in particular for insulating small diameter conductors.

The aim of the present invention is to provide insulation using a tape which is very flexible which is mechanically strong, which is not fragile, and which is easy to wind around conductors by machine.

SUMMARY OF THE INVENTION

The present invention provides a method of insulating electrical conductors, wherein a tape of porous mica paper and of glass felt or cloth or plastic material film is wound round the conductors, wherein the tape is impregnated with a varnish comprising a polymerizable liquid resin, and wherein the impregnated tape is polymerized by heat treatment, the method including the improvement whereby an adhesive material is initially added to the tape to provide adhesion between the porous mica paper and the glass felt or cloth or the plastic material film, said adhesive material comprising a polymer powder having chains of oxazolidone groups containing groups with epoxy terminations, and whereby the polymerizable liquid resin of the varnish essentially contains isocyanate groups which are transformed into isocyanurate groups during polymerization.

The invention preferably includes at least one the following features:

the adhesive powder is added to the tape at a concentration of about 20% by weight;

the adhesive powder is added to the tape by a wet process, and is preferably dissolved in methylethylketone;

the tape is free from an anti-adhesive intermediate layer;

the impregnating varnish is free from solvent;

the tape adhesive powder is obtained by reacting an epoxy resin with an isocyanate in the presence of a condensation catalyst, and then mixing the product of the condensation with an epoxy resin;

a catalyst is added to the mixture of the condensation product and epoxy resin for catalyzing the reaction of the epoxy groups with the isocyanate groups; and the impregnating varnish based on isocyanate derivatives has a small quantity of epoxy derivatives and a stabilizer added thereto.

The method in accordance with the invention makes it possible to form a resin of controlled structure within the insulating wall of the conductor, said resin comprising:

firstly linear polymer blocks with oxazolidone linkage, which blocks are mainly concentrated in the mica tape; and secondly cross-linked polymer blocks with isocyanurate linkage, which blocks come from the impregnating varnish and serve as nodes for the formation of a three-dimensional macro-molecular lattice.

The use of a powder adhesive constituted by a resin having oxazolidone linkage with epoxy terminal groups ensures very good adhesion between the mica paper and the glass felt or cloth or the film of plastic material, because of the good wettability of mica by such a resin, and because of its high adhesive power on glass, which power is retained at high temperature, i.e. up to more than 200° C. The resulting tape is very flexible since its binder is a linear polymer of thermoplastic nature. Its flexibility greatly facilitates its installation around fine-gauge conductors.

The presence of a concentration of about 20% by weight of the adhesive binder between the porous mica paper and the glass felt or cloth or the film of plastic material makes it possible to obtain good impregnation by the varnish under vacuum and pressure, and reduces the fragility of the tape, which is a feature of so-called "dry" tapes having about 8% binder and which run the risk of breaking the mica while the tape is being laid, and consequently giving rise to dispersion in values for dielectric strength.

The lack of an intermediate layer makes it easier to tape conductors by machine.

Further, the impregnating varnish is a single component varnish without a solvent. It is very stable at ambient temperature at which its viscosity is low enough to enable it to impregnate the taped winding easily. This varnish becomes highly reactive at about 150° C. in the presence of the active sites in the lattice of the tape polymer. This encourages the impregnating resin to gell and leads to low consumption of the impregnating varnish. It may be assumed that the epoxy functions present in the tape react rapidly with the impregnating varnish even in the absence of a catalyst by forming two types of heterocycle, including, essentially, the isocyanurates which stiffen the resin. It is even preferable for the varnish to have no catalyst. The heterocycles formed in this way provide increased thermal and mechanical strength relative to silicone insulants often used in similar applications.

Examples of methods in accordance with the invention for providing insulation by impregnating electric conductors are described below.

EXAMPLE 1

(a) Forming a Tape

The following ingredients are used: 120 g/m² porous mica paper; 25 g/m² glass cloth; and 36 g/m² adhesive powder having oxazolidone structural units with epoxy terminations and at a concentration of 20% by weight.

The powder is obtained by reacting a liquid epoxy resin sold under the name Epon 827 by Shell Chemical Co., and toluene diisocyanate in the presence of benzyl-trimethylammonium chloride in ethanol. This forms solely a polymer having oxazolidone cycle chains with epoxy terminations.

This product is then mixed with non-modifed epoxy resins and is dissolved in methylethylketone in order to facilitate tape manufacture, the proportions being as follows:

30 parts polymer having oxazolidone cycles and epoxy terminations;
60 parts liquid epoxy resin sold under the name DEN 438 by Dow Chemical Co.;
10 parts liquid epoxy resin sold under the name EPON 827; and
150 parts methylethylketone.

A catalyst may then be incorporated in the tape, for example two parts blocked boron trifluoride sold under the name Anchor 1115 by Anchor Chimie.

(b) Forming the Impregnation Varnish

Mix:
93 parts isocyanate sold under the name K88 by Bayer;
7 parts liquid epoxy resin EPON 827; and
0.2 parts maleic anhydride acting as a stabilizer.

A laboratory scale test piece representing part of a motor winding is made from a bundle of 12 covered copper conductors each having a rectangular 4.5 mm×2 mm section and a length of 450 mm. The bundle is insulated by means of four half-coverings of the above tape, plus a layer of polyimide (sold under the trademark "Kapton" by Du Pont de Nemours). It is impregnated with the above varnish under alternating vacuum and pressure and is then gelled for two hours at 150° C. Finally it is polymerized for 15 hours at 200° C.

Dielectric breakdown tests in oil show a minimum dielectric strength of 39 kV for insulation which is less than 1 mm thick.

EXAMPLE 2

The same tape is used as that described in part (a) of Example 1.

The impregnation varnish is constituted solely by polyisocyanate as sold under the name OPA 235 by UpJohn Chemical Co.

Benzyl-triethylammonium chloride may be added as a catalyst, but it is not necessary.

A test piece made under the same conditions as those described above gave a minimum dielectric strength of 36 kV.

EXAMPLE 3

The tape structure is similar to that of Example 1, but the adhesive resin is different.

Begin by forming a polymer having oxazolidone structural units with epoxy terminations by reacting cycloaliphatic epoxy resin as sold by Ciba-Geigy Corporation under the name CY-192 and toluene diisocyanate in the presence of benzyltrimethylammonium chloride in ethanol.

This product is mixed with liquid epoxy resin and is dissolved in methylethylketone in order to make an adhesive material having the following construction:

105 parts of the product from the above reaction;
45 parts of CY-192 epoxy resin; and
100 parts methylethylketone.

A catalyst may be added to the adhesive material, but that is not necessary.

The same varnish is used as in Example 1, and the insulant is impregnated, gelled and polymerized in the same way.

The minimum dielectric strength is 35 kV.

EXAMPLE 4

Use the same mica paper and the same glass cloth as in Example 1.

Provide the adhesive powder by mixing cycloaliphatic liquid epoxy resin as sold by Ciba-Geigy Corporation under the name CY-179 with OPA 235 polyisocyanate as mentioned in example 2 above, in the presence of lithium chloride in methanol.

This product is mixed with an epoxy resin and is dissolved in methylethylcetone.

The same varnish is used as in Example 1, and the insulant is impregnated, gelled and polymerized in the same manner.

The minimum dielectric strength is 38 kV.

What is claimed is:

1. A method of insulating electrical conductors including winding a tape of porous mica paper and a backing layer selected from the group consisting of glass felt, glass cloth, and plastic material film around the conductors, impregnating the tape with a varnish comprising a polymerizable liquid resin, and polymerizing the impregnated tape by heat treatment, wherein the improvement comprises adding an adhesive material to the tape to provide adhesion between the porous mica paper and the backing layer, said adhesive material comprising a polymer having chains of oxazolidone groups containing groups with epoxy terminations, and wherein the polymerizable liquid resin of the varnish contains isocyanate groups which are transformed into isocyanurate groups during polymerization.

2. A method according to claim 4, wherein the adhesive powder is added to the tape at a concentration of about 20% of the total weight of the adhesive powder and the tape.

3. A method according to claim 1, wherein the adhesive material is a liquid.

4. A method according to claim 3, wherein the adhesive material comprises an adhesive powder dissolved in methylethylketone.

5. A method according to claim 1, wherein the tape is free from an anti-adhesive intermediate layer.

6. A method according to claim 1, wherein the impregnating varnish is free from solvent.

7. A method according to claim 4, wherein the adhesive powder is obtained by reacting an epoxy resin with an isocyanate in the presence of a condensation catalyst, and then mixing the product of the condensation with an epoxy resin.

8. A method according to claim 7, further comprising adding a catalyst to the mixture of the condensation product and epoxy resin for catalyzing the reaction of the epoxy groups with the isocyanate groups.

9. A method according to claim 1, wherein the impregnating varnish containing isocyanate groups has a small quantity of epoxy derivatives and a stabilizer added thereto.

* * * * *